(12) United States Patent
Ben-Omrane et al.

(10) Patent No.: US 10,566,874 B2
(45) Date of Patent: Feb. 18, 2020

(54) ROTARY ELECTRICAL MACHINE PROVIDED WITH PULLEY FOR RECEIPT OF BELT, AND WITH DEVICE FOR REGULATION OF TENSION OF BELT

(71) Applicant: VALEO EQUIPEMENTS ELECTRIQUES MOTEUR, Creteil (FR)

(72) Inventors: Ryadh Ben-Omrane, Chevilly-Iarue (FR); Christophe Monteil, Paris (FR); Blaise Rouleau, Clamart (FR)

(73) Assignee: Valeo Equipements Electriques Moteur, Creteil (FR)

( * ) Notice: Subject to any disclaimer, the term of this patent is extended or adjusted under 35 U.S.C. 154(b) by 205 days.

(21) Appl. No.: 15/548,750

(22) PCT Filed: Feb. 15, 2016

(86) PCT No.: PCT/FR2016/050336
§ 371 (c)(1),
(2) Date: Aug. 3, 2017

(87) PCT Pub. No.: WO2016/132054
PCT Pub. Date: Aug. 25, 2016

(65) Prior Publication Data
US 2018/0019638 A1 Jan. 18, 2018

(30) Foreign Application Priority Data
Feb. 16, 2015 (FR) ...................................... 15 51265

(51) Int. Cl.
*H02K 9/06* (2006.01)
*H02K 5/20* (2006.01)
(Continued)

(52) U.S. Cl.
CPC ......... *H02K 7/1008* (2013.01); *F16H 7/1281* (2013.01); *H02K 5/161* (2013.01);
(Continued)

(58) Field of Classification Search
CPC .. F16H 7/08; F16H 7/1281; F16H 2007/0806; F16H 2007/081;
(Continued)

(56) References Cited

U.S. PATENT DOCUMENTS 5,521,450 A 5/1996 Rondier
5,883,450 A 3/1999 Abadia et al.
(Continued)

FOREIGN PATENT DOCUMENTS

AT 130902 B 12/1932
CN 203431112 U 2/2014
(Continued)

*Primary Examiner* — Jermele M Hollington
*Assistant Examiner* — Alexander A Singh
(74) *Attorney, Agent, or Firm* — Berenato & White, LLC

(57) ABSTRACT

The rotary electrical machine comprises, in front, a pulley (3) secured to a shaft (9) of a rotor (20) passing through the front bearing (1a) of a housing. The bearing includes a base, having a nose (18) for mounting a front ball bearing (7) for rotating the shaft (9), and air inlets (15) defined by arms belonging to an outwardly opening area connecting a peripheral strip of material from the base to the nose (18) in order to shift the nose (18) toward the front in accordance with the central body of a device (100) for adjusting the tension of a belt received in the groove (31) of the pulley (3) and attached onto the housing (1a, 1b). The adjustment device (100) comprises at least one idler (200, 201) for tensioning the belt and a central opening (102) enabling passage of air through the air inlets (15).

19 Claims, 6 Drawing Sheets

(51) Int. Cl.
- *H02K 5/26* (2006.01)
- *H02K 7/10* (2006.01)
- *F16H 7/12* (2006.01)
- *H02K 5/16* (2006.01)
- *H02K 7/08* (2006.01)
- *F16H 7/08* (2006.01)

(52) U.S. Cl.
CPC ........... *H02K 7/083* (2013.01); *H02K 9/06* (2013.01); *F16H 2007/081* (2013.01); *F16H 2007/0806* (2013.01); *F16H 2007/0842* (2013.01); *F16H 2007/0865* (2013.01); *F16H 2007/0874* (2013.01); *F16H 2007/0893* (2013.01)

(58) Field of Classification Search
CPC ..... F16H 2007/0842; F16H 2007/0865; F16H 2007/0874; F16H 2007/0893; H02K 9/00; H02K 9/005; H02K 9/02; H02K 9/04; H02K 9/08; H02K 9/10; H02K 9/12; H02K 9/14; H02K 9/16; H02K 9/18; H02K 9/19; H02K 9/193; H02K 9/197; H02K 9/20; H02K 9/24; H02K 9/26; H02K 9/28; H02K 5/00; H02K 5/02; H02K 5/06; H02K 5/08; H02K 5/10; H02K 5/12; H02K 5/20; H02K 5/24; H02K 5/26; H02K 7/1008; H02K 5/161; H02K 7/083; H02K 9/06; H02K 5/1732; H02K 7/1004
USPC .................. 310/52, 53, 58, 60 R, 62, 63
See application file for complete search history.

(56) References Cited

U.S. PATENT DOCUMENTS

| | | | |
|---|---|---|---|
| 5,977,669 A | 11/1999 | Yoshida et al. | |
| 5,998,903 A | 12/1999 | Umeda et al. | |
| 6,198,190 B1 | 3/2001 | Umeda et al. | |
| 6,897,597 B1 | 5/2005 | Armiroli et al. | |
| 7,196,439 B2 | 3/2007 | Pierret et al. | |
| 7,224,093 B2 | 5/2007 | Abadia et al. | |
| 7,932,649 B2 | 4/2011 | Dubuc et al. | |
| 8,008,834 B2 | 8/2011 | Gas et al. | |
| 8,434,210 B2 | 5/2013 | Pfleger et al. | |
| 9,097,314 B2 | 8/2015 | Wolf et al. | |
| 9,551,402 B2 | 1/2017 | Jud et al. | |
| 2003/0094865 A1* | 5/2003 | Sugitani | H02K 5/20 310/58 |
| 2009/0184601 A1 | 7/2009 | Dubus et al. | |
| 2010/0090561 A1* | 4/2010 | Leroy | H02K 9/06 310/216.114 |
| 2014/0315673 A1* | 10/2014 | Zacker | F16H 7/1218 474/135 |

FOREIGN PATENT DOCUMENTS

| | | |
|---|---|---|
| DE | 29714275 U1 | 12/1998 |
| DE | 102013005884 A1 | 10/2014 |
| EP | 0459894 A1 | 12/1991 |
| EP | 0831580 A2 | 3/1998 |
| EP | 0881752 A1 | 12/1998 |
| EP | 2067238 A2 | 6/2009 |
| EP | 2128489 A2 | 12/2009 |
| EP | 2557295 A2 | 2/2013 |
| FR | 2710199 A1 | 3/1995 |
| FR | 2734425 A1 | 11/1996 |
| FR | 2739734 A1 | 4/1997 |
| FR | 2745444 A1 | 8/1997 |
| FR | 2784248 A1 | 4/2000 |
| FR | 2991420 A1 | 12/2013 |
| WO | WO0169762 A1 | 9/2001 |
| WO | WO2004040738 A1 | 5/2004 |
| WO | WO2005124123 A1 | 12/2005 |
| WO | WO2006129030 A1 | 12/2006 |
| WO | WO2007031679 A2 | 3/2007 |
| WO | WO2007099260 A1 | 9/2007 |
| WO | WO2013136021 A2 | 9/2013 |
| WO | WO-2014100894 A1 * | 7/2014 ........... F16H 7/1218 |

* cited by examiner

ROTARY ELECTRICAL MACHINE PROVIDED WITH PULLEY FOR RECEIPT OF BELT, AND WITH DEVICE FOR REGULATION OF TENSION OF BELT

CROSS-REFERENCE TO RELATED APPLICATIONS AND CLAIM TO PRIORITY

This application is a national stage application of International Application No. PCT/FR2016/050336 filed Feb. 15, 2016, which claims priority to French Patent Application No. 1551265 filed Feb. 16, 2015, the disclosures of which are incorporated herein by reference and to which priority is claimed.

FIELD OF THE INVENTION

The present invention relates to a rotary electrical machine provided with a pulley for receipt of a belt, and with a device for regulation of the tension of the belt.

The rotary electrical machine can be an electric motor, a starter with a belt, an alternator, or a reversible alternator known as an alternator-starter operating in electric motor mode, in particular in order to start the thermal engine of a motor vehicle.

BACKGROUND OF THE INVENTION

A machine of this type with a device for regulation of the tension of the belt is described for example in patents AT 130902 and EP 0 459 894, to which reference will be made for further details.

The rotary electrical machine can be an electric motor, as in patent AT 13 902. As can be seen in FIG. 1, which is similar to that of patent AT 130902, this machine 1 comprises a device for regulation of the tension of the belt, comprising a regulation arm 10' which pivots around a nose provided with a pivot integral with a front flange 2' belonging to a housing of the machine, and supporting a roller 9' for tensioning of the belt which penetrates into a pulley (with no reference) integral with the end (not shown) of a rotor shaft of the machine, which, as is known, is integral with a rotor. The housing, and thus the front flange 2', is formed in a known manner in order to be secured on a fixed part. This flange 2' constitutes a support flange for the device for regulation of the tension of the belt.

More specifically, the flange 2' supports a support arm 7' for a traction spring 8' which is connected to the arm 10' with the presence of a nut 12' for regulation of the tension of the spring 8'. In this embodiment, the flange 2' has a stop 3' for receipt of a nose 5' of an arm 6', the upper end 7' of which acts as a support for the spring 8' exerting a force on the end 7'.

The rotary electrical machine can be an alternator, as described in patent EP 0 459 894, which also describes a rotary electrical machine provided with a pulley (not shown) for receipt of a belt, and with a device for regulation of the tension of the belt, comprising a tensioning roller, regulation arm which is mobile in rotation relative to a front end flange of the alternator designed to be secured on the engine block of a motor vehicle, and means for maintenance and/or regulation of the tension of the belt. According to one embodiment, the means for regulation of the tension of the belt consist of a spiral spring which is integral with the front flange and the regulation arm, with the said spring exerting a displacement force on the tensioning roller for an optimum tension of the belt. As a variant, the regulation means comprise a toothed sector which is provided on the regulation arm, and is designed to cooperate with a toothed sector with a complementary form integral with the front flange of the electrical machine. According to another embodiment, the toothed sectors consist of racks. The front flange comprises a square which is provided with holes so that it can be secured by means of securing means, such as screws, on the engine block of the motor vehicle. This flange also constitutes a flange for support of the device for regulation of the tension of the belt. The tensioning roller is fitted such as to rotate on the arm advantageously by means of a ball bearing which is interposed radially between the inner periphery of the roller and a pivot, which is a bolt in this embodiment, and is integral with the front flange, as described and shown for example in FIG. 2 of this patent EP 0 459 894.

In all cases, thanks to the device for regulation of the tension of the belt, optimum tension of the belt is obtained, sliding of the belt is prevented, and there is filtration of the vibrations which can detract from the satisfactory operation of the rotary electrical machine, in the knowledge that these vibrations can break the securing projections, such as ears or lugs or plates, which the housing with a front flange of an electrical machine has, in order to secure it on a fixed part, such as the engine block of a motor vehicle.

The belt can have a flat form with a trapezoidal cross-section, or it can consist of a poly-V (registered trademark) belt, with the transmission of movement between the flexible belt and the pulley taking place by adhesion according to one embodiment.

The pulley can be made of metal, such as steel for example, or aluminium which is anodised for example. As a variant, the pulley is made of plastic material reinforced by fibres and/or fillers in order to reduce the noises. This pulley comprises a groove which is complementary to the form of the belt, for receipt of the latter. When the pulley is made of metal, it can be covered locally with plastic material in particular at its groove.

The groove in the belt can comprise a groove with parallel flanks and a smooth base for receipt of a flat belt. As a variant, the groove in the pulley can have a trapezoidal form, in order to receive a belt with a trapezoidal cross-section, which transmits more torque than a flat belt. As a variant, the pulley can comprise a base provided with furrows for receipt of the teeth of a poly-V (registered trademark) belt, which belt is striated in the direction of the length. The lower part of the belt is in all cases designed to cooperate with the base of the groove in the pulley, whereas the upper part of the belt is designed to cooperate with the tensioning roller (see FIG. 1).

In a known manner, the belt is flexible, and comprises a body based on elastomer reinforced by fibres and a force armature consisting of cables such as polyester cables. This belt is known as a rubberised belt. The composition of the body based on elastomer, known as the base rubber, depends on the different belt manufacturers.

Thus, a belt with a trapezoidal cross-section comprises for example an upper part comprising a twill fabric, a force textile armature consisting for example of polyester cables, a base body made of elastomer belonging to the lower part of the belt, which body is reinforced by transverse fibres resistant to abrasion, and a rubber, for example polychloroprene, which is resistant to oils, and ensures static and dynamic adhesion to the textile armature. Advantageously, the inner part of the belt is provided with notches in order to increase the flexibility of the belt and limit the heating.

A poly-V belt differs from a trapezoidal belt in that its base body is provided with striations in the direction of the length, with teeth with a triangular cross-section belonging to the lower part of the belt. The furrows in the base of the groove in the pulley are designed to receive the teeth of the belt in a complementary manner.

In a known manner, poly-V belts are more advantageous than belts with a trapezoidal cross-section, since:

they are more flexible, which permits use on pulleys with a smaller diameter;

they permit optimum adhesion on the entire surface of the pulley, and homogenous distribution of the contact pressure between the belt and the pulley;

they make possible higher movement transmission ratios;

a single belt is sufficient for example, in order, from the pulley of the crankshaft of a thermal engine of a motor vehicle, to drive the motor vehicle alternator and another accessory of the motor vehicle, such as the fan or its air-conditioning compressor.

As a variant, the pulley comprises a groove with a base forming meshing for receipt of complementary notches contained on the base body made of elastomer of the belt with fabric and cable force textile armature. In this embodiment, the force is then transmitted by adhesion and meshing.

A conventional rotary electrical machine comprises a housing on which there is fitted firstly a stator and secondly, centrally by means of bearing means such as ball bearings with one or two rows of balls, a shaft of a rotary rotor. The shaft is integral with a rotor which rotates inside the stator. The pulley is fitted on the exterior of the housing and at one of the ends of the shaft, known as the front end, for example by screwing. The housing is designed to be secured on a fixed part, and comprises at least one front flange adjacent to the pulley, and a rear flange which is furthest away from the pulley. These flanges are known respectively as the front bearing and the rear bearing. The shaft passes through the bearings.

In the case of an electric motor, the stator is an inductor stator, and the rotor is an induced rotor. In the case of an alternator, in particular for a vehicle with a thermal engine, the stator is an induced stator and the rotor is an inductor rotor.

As is known, the rotor can be a claw rotor, a wound rotor with projecting poles, or a rotor with permanent magnets implanted radially and/or axially in the body of the rotor comprising a set of plates. The claw rotor or the projecting poles rotor can be provided with permanent magnets, in particular in order to increase the power of the rotary electrical machine.

In order to decrease the effects of Foucault currents, the stator can comprise a body in the form of a set of plates supporting a stator winding which extends on both sides of the stator body comprising windings with continuous wires or in the form of bars. The body of the stator has an axial length which is shorter than, or equal to, that of the rotor. The axis of the rotor shaft constitutes the axis of rotation of the electrical machine, and the axial axis of symmetry of the rotor and of the stator body constituting two coaxial parts. An air gap exists between the inner periphery of the stator body and the outer periphery of the rotor body.

The electrical machine can be of the polyphase type comprising at least three phases. A rectifier bridge or an inverter can be associated with the stator winding, in order in particular to transform the induced alternating current produced by the stator into direct current, in order to supply the consumers of the motor vehicle and/or to recharge the battery of the vehicle.

The front bearing is advantageously perforated for circulation of the air and cooling of the electrical machine.

As a reminder, reference will be made for example to document FR 2 739 734 which describes a rotary electrical machine in the form of an alternator shown in FIG. 2, which is a view in cross-section of a conventional alternator identical to FIG. 1 of document FR 2 739 734. A machine of this type can comprise a housing $1a$, $1b$ which is designed to be secured on a fixed part, and comprises at least two flanges which are known respectively as the front bearing $1a$ and the rear bearing $1b$, and are advantageously made of aluminium, in the knowledge that the front and rear correspond to an orientation from left to right in this FIG. 2.

These bearings $1a$, $1b$ are assembled for example by means of tie rods, such as to retain between them on their outer periphery a stator 6 comprising a stator body in the form of a set of plates which supports a stator winding extending on both sides of the body of the stator, and passing through the latter. For this purpose, this body has in this embodiment recesses for the passage of the wires of a polyphase stator winding in the form of continuous conductive wire windings with a layer of electrical insulation such as enamel. The housing $1a$, $1b$ is designed to be secured on a fixed part.

In this embodiment, the bearings $1a$, $1b$ have a hollow form, and each have on their outer periphery a peripheral rim with a globally annular form designed to retain the body of the stator 6, in this case by means of a shoulder provided on their free end. These bearings $1a$, $1b$ each have centrally a cylindrical receptacle for fitting of bearing means, in this case respectively a front ball bearing 7 and a rear ball bearing 8 receiving such as to rotate it a metal shaft 9 of a rotor, which supports integrally a rotor 20. The shaft 9 passes through the bearings $1a$, $1b$, which each have a sleeve for formation of the receptacle respectively of the bearing 7 and the bearing 8.

The outer ring of the ball bearing 7 is in close contact with the outer edge of the receptacle of the front bearing $1a$, whereas an expansion ring is interposed radially between the outer edge of the receptacle of the rear flange $1b$ and the outer periphery of the outer ring of the ball bearing 8. The outer edge of the receptacles is constituted by the inner periphery of the sleeves.

The receptacles of the bearings $1a$, $1b$ are perforated centrally for passage of a shaft 9, the outer periphery of which is in close contact with the inner periphery of the inner rings of the bearings 7, 8. The front ball bearing 7 has a larger diameter than that of the rear ball bearing 8.

In this FIG. 2, the shaft 9 has an axial axis of symmetry which is represented in FIG. 2, and the terms axial, radial and transverse will be used with reference to this axis which constitutes the axis of rotation of the alternator. The same applies in the other figures.

The rotor 20 is a claw rotor which in this embodiment comprises two magnet wheels 4, 5 and a central core which is implanted between the magnet wheels, and supports an excitation winding 21. The central core can be distinct from the magnet wheels, or it can be in two parts each of which is integral with one of the magnet wheels 4, 5. The magnet wheels 4, 5 and the central core are advantageously made of ferromagnetic material, and the same applies to the shaft 9 on which the wheels 4, 5 and the hub are secured, for example by means of knurled portions of the central shaft 9 which passes through the wheels 4, 5 and the hub.

These wheels 4, 5 each have a flange which supports on its outer periphery teeth with globally axial orientation, respectively 41, 51, which are imbricated in one another, whilst leaving between one another gaps such that the teeth of one of the magnet wheels face axially towards the flange of the other magnet wheel. An air gap exists between the outer periphery of the claw rotor 20, constituted by the outer periphery of the teeth 41, 51, and the inner periphery of the body of the stator 6 with an axial length which is smaller than, or equal to, the axial length of the rotor 20. In this embodiment, the teeth 41, 51 have leading 43, 53 and trailing 42, 52 edges, which are curved relative to the direction of rotation designated by the arrow F1, such as to give rise to circulation of the air according to the arrow F2 in all the gaps between the teeth 41, 51.

As a variant, in a conventional manner, the teeth 41, 51 are not curved, and have a globally trapezoidal form.

The front face of the wheel 4 has a front fan 10 secured on it, whereas the rear face of the wheel 5 has a rear fan 12 secured on it, such that the rotor 20 is flanked by two internal fans 10, 12, which are implanted in the housing 1. The fans 10, 12 have blades respectively 11, 13, and are perforated centrally for the passage of the shaft 9 of the rotor 20. The blades 11, 13 can be formed such as to form centrifugal fans. As a variant, the blades 11 of the front fan 10 can be formed in order to constitute a combined fan with radial and axial action. As a variant, it is possible to eliminate the front fan 10, with the flange and the peripheral teeth 41 of the wheel 4 constituting a fan.

The bearings 1a, 1b are perforated, and in this embodiment each have axial air inlets, respectively 15, 17, and radial air outlets, respectively 14, 16, such that the internal fans 10, 12 ensure circulation of the internal air in cooperation with the inlets 15, 17 and the outlets 14, 16, in order to ensure cooling of the components of the alternator, in particular of the winding 21, of the stator 6, and of the bearings 7, 8. The air outlets 14, 16 are mostly each arranged respectively in the annular peripheral rims with globally axial orientation of the bearings 1a, 1b. The air inlets 15, 17 are provided respectively in a front nose 18 which the front bearing 1a has, and in a base with transverse orientation of the rear bearing 1b. The receptacles with a cylindrical form of the bearings 7, 8 are provided centrally in the nose 18 of the bearing 1, and in the base of the bearing 1b, each having an aforementioned sleeve for accommodation of the bearings 7, 8. The nose of the bearing 1a is connected to the peripheral rim of the bearing 1a by a frusto-conical wall with slight inclination which constitutes the base of the bearing 1a. The inlets 15 are provided in the nose 18, whereas the outlets 14 with an oblong form are provided for reasons of withdrawal partly in the frusto-conical wall and partly in the peripheral rim of the bearing 1a, as can be seen in this FIG. 2.

On the front side, on the exterior of the housing 1a, 1b, the alternator comprises a pulley 3 which is made of metal or reinforced plastic material, adjacent to the front end of the front bearing 1a.

The pulley 3, which for example is made of steel or aluminium, or as a variant of plastic material reinforced by fibres and/or fillers, comprises a groove 31, the base of which is provided with furrows for receipt in a complementary manner of the teeth of a poly-V belt, not represented for the sake of greater clarity. There are six teeth and furrows in this embodiment.

The pulley 3 is provided with a cavity (with no reference) with a transverse base, for receipt of a nut (with no reference), which is screwed onto the threaded front end of the rotor shaft 9, which for this purpose passes through a central opening which the base of the cavity in the pulley comprises. At the rear, this pulley 3 comprises a sleeve (with no reference) through which the shaft 9 passes, and which is in contact at the rear with the front end of the inner ring of the ball bearing 7. As a variant, the sleeve of the pulley is replaced by a ring. For further details on the fitting of the pulley 3 on the front nose 18, reference will be made to FIG. 3, which is a front view of the alternator in FIG. 2. It can be seen that a brace 33 in the form of a ring through which the shaft 9 passes is interposed axially between the rear end of the inner ring of the bearing 7 and the front end of the front magnet wheel 4 which is secured on the shaft 9, as well as the hub, for example, in a conventional manner, by means of a knurled portion 30 of the latter. Thus, the pulley 3 is integral in rotation and in translation with the shaft 9. It will be noted that the brace 33 is shorter axially than the inner ring of the bearing 7.

In this FIG. 3, the reference 31 designates the groove in the pulley, whereas the reference 36 designates the threaded part of the rotor shaft 9 which passes through the nose 18 of the front bearing provided with a sleeve 22, in which the outer ring of the bearing 7 is fitted. The outer ring of the bearing 7 is wedged axially between a retention part (with no reference) and a shoulder provided at the front of the sleeve 22 closed by a ring 32 interposed between the pulley 3 and the balls of the bearing 7, advantageously in a sealed manner. The ring 32, with an annular form, has the front end of the shaft passing through it, and constitutes a protective ring which prevents the introduction of water or dirt at the bearing 7. The retention part, with an annular form, is perforated centrally for passage of the brace, and has in its outer periphery holes, for example four of them, for the passage of units, in this case screws (with no reference) for securing on the sleeve 22 which is tapped for this purpose. The front bearing 1a thus has a nose 18 provided with a receptacle for fitting of a ball bearing 7, the inner ring of which is integral in rotation with a rotor shaft 9 which passes through the nose 18 of the front bearing 1a, in order to support in a fixed manner a pulley for receipt of a flexible movement transmission belt 3.

The rear magnet wheel 5 is integral with the shaft 9, also by means of a knurled portion of the latter. The rear end of the shaft 9 passes through the base of the rear bearing 1b, and has a smaller diameter than the front end of the shaft 9, which is mechanically subjected to greater stress because of the presence of the pulley 3 for receipt of the movement transmission belt. This is why the bearing 7 has a larger diameter than the bearing 8.

This shaft 9 has at its rear end two collector rings with no reference.

These collector rings belong to a connector which is added onto the rear end of the shaft 9, as described for example in document FR 2 710 199. This connector thus has a body made of electrically insulating material, such as plastic material, fitted onto the rear end of the shaft 9, and supporting the collector rings. At the front, this connector body has two arms, in each of which an electrically conductive tongue is embedded for electrical connection of one of the ends of the excitation winding 21 of the rotor 20 to the collector ring concerned, as can be seen better in FIGS. 10 and 11 of this document FR 2 710 199, also showing firstly the expansion ring interposed radially between the outer edge of the receptacle with a sleeve of the rear bearing 1b and the outer periphery of the outer ring of the rear bearing 8, and secondly, the knurled portion of the shaft 9 for connection of the rear magnet wheel 5 of the rotor 20 to the shaft 9, in the knowledge that the rear fan 12 in this case has blades with a radial height greater than that of the front fan 10, which is less powerful.

The base of the rear bearing 1b supports at the rear (on the side opposite the rotor 20) a brush-holder (with no reference) which belongs in a known manner to a tension-regulating brush-holder assembly which the alternator has.

The brush-holder has two brushes which are each designed to come into contact with one of the collector rings of the connector, for the electrical supply of the winding 21 of the rotor.

The lower part of this FIG. 2 shows the connection of one of the ends of the winding of the stator to one of the electrical conductors of a connector (with no reference), which in this example belongs to a bridge for rectification of alternating current into direct current which is supported by the base of the bearing 1b on the rear side of the latter. This bridge comprises negative diodes for example which are fitted into the base of the rear bearing 1b, constituting a heat dissipater, and positive diodes which are fitted in an electrically conductive positive heat dissipater which supports a terminal for connection by means of a cable to the positive terminal of the battery of the motor vehicle. The positive dissipater is insulated electrically by the rear bearing. The diodes can be fitted for example head to tail, as in document FR 2 734 425, to which reference will be made for further details. This document also shows the brush-holder tension regulator assembly. As a variant, the tails of the diodes are oriented axially in the same direction.

The number of pairs of diodes depends on the applications, in particular on the number of phases which the alternator comprises. For example, for a three-phase machine, at least three pairs of diodes are provided. In a known manner, the number of teeth 41, 51 which each wheel 4, 5 has varies between six and eight. The number of notches in the body of the stator 6 depends on the number of phases of the alternator. Thus, for wheels 4, 5 which each have six teeth, for a three-phase alternator 36 notches are provided in the body of the stator 6. For wheels 4, 5 which each have seven teeth and an alternator with seven phases, 98 notches are provided in the body of the stator 6. For wheels 4, 5 which each have six teeth and an alternator with seven phases, 84 notches are provided in the body of the stator 6.

The number of phases of the alternator can be 3, 5, 6 or 7 phases, with two windings being able to be provided per phase. The phases can be fitted in the form of a star and/or a triangle, with the connector of the bridge being arranged accordingly.

This FIG. 2 shows that the assembly of the electronic components (diodes, voltage regulator) are supported by the base of the electrically conductive rear bearing 1b, like the front bearing 1a. This bearing 1b comprises a projection (with no reference) for securing on a fixed part, for example in the form of a lug or ear which is perforated for the passage of means, such as a screw or rear bearing 1b, for securing on the engine block of the motor vehicle. This bearing 1b is thus connected electrically to the earth, and constitutes a negative heat dissipater. The same applies to the front bearing 1a, which has two projections (with no reference) for securing on a fixed part, for example in the form of lugs or ears, which are perforated for the passage of means, such as screws, for securing of the rear bearing on the engine block of the vehicle. The housing 1 of the alternator is thus secured at three points on the engine block. As a variant, the fixed projections consist of at least one plate with orientation which is tangential relative to the peripheral rim of one of the bearings 1a, 1b with which it is integral. This plate comprises at least one hole, and as a variant two holes, for passage of means for securing on the engine block of the vehicle. Two diametrically opposite plates can be provided on the front bearing 1a. It will be appreciated that the number of securing points depends on the applications.

A perforated protective cover 2, which for example is made of reinforced plastic material or sheet metal, covers the brush-holder tension regulator assembly and the rectifier bridge. This cover 2 is integral with the rear bearing 1b, whilst having a hollow form. Openings (with no reference) are provided in the base of the cover and in the peripheral skirt which the cover 2 has on its outer periphery for the circulation of the air inside the machine by means of the rear fan 12, which thus cools the integrated electronics of the alternator, and for this reason is more powerful than the fan 10.

In a known manner, the alternator is implanted in the vicinity of the front face of the engine block of the vehicle and the movement transmission belt intervenes between a drive pulley which is integral with the crankshaft, and the pulley 3 which constitutes a driven pulley. The pulley of the crankshaft is implanted at the front face of the engine block of the vehicle. The belt can also be used to drive another accessory of the vehicle, such as the pulley of the air-conditioning compressor or the water pump pulley, which accessory is implanted in a known manner in the vicinity of the front face of the vehicle.

When the thermal engine of the vehicle is running after being started by means of a starter, and the excitation winding 21 of the rotor 20 is supplied electrically via the brush-holder tension regulator assembly, the rotor 20 is magnetised, and the teeth 41, 51 constitute North and South poles, and create an induced magnetic flux in the stator 6. An alternating current then circulates in the winding of the stator 6. This alternating current is then rectified in the bridge in order to produce a direct current, so as to supply the consumers of the vehicle with power and/or recharge the battery of the vehicle.

As a variant, the current rectifier bridge is replaced by an inverter, comprising for example transistors of the MOSFET type, replacing the diodes as described for example in document FR 2 745 444. Means for monitoring the rotation of the rotor, such as, firstly, Hall-effect sensors supported by a sensor-holder opposite a magnetic target supported for example by the rear fan 12 or the magnet wheel 5, associated with a magnetic target, or secondly a resolver, are associated with this inverter. This therefore creates a reversible alternator known as an alternator-starter, which makes it possible in particular to replace the starter in order to start the thermal engine, with the alternator then operating in electric motor mode to drive the pulley 3, which then becomes a drive pulley driving the pulley of the crankshaft. The electronic components of this inverter can then be supported by a casing which is distinct from the machine, or can be integrated in the machine whilst being fitted above the rear bearing 1b for example, on a mezzanine which is integral with the rear bearing 1b, and belongs to the housing. In addition to its function as a starter and its function of starting and stopping the thermal engine (known as the stop-start function), the alternator-starter can carry out other functions depending on its power, i.e. in particular a function of recuperative braking, a function of charging an ultra-capacitor, and a function of preventing stalling of the thermal engine of the motor vehicle.

A problem then occurs when it is wished to equip this rotary electrical machine with a device for regulation of the tension of the belt, since in the aforementioned patents the front bearing has an additional function of supporting this regulation device.

In patent AT 130902, the front bearing is not designed to permit circulation of the air inside the rotary electrical machine.

In patent EP 0 459 894, the housing has a complicated form, taking into account the fitting (not shown) to be carried out of the pulley.

Without changing the size of the rotor and the stator, it is conceivable to make the flange for support of the belt tension regulation device distinct from the front bearing, and to secure this support flange on the housing of the electrical machine. This leads to an increase in the cantilever of the pulley, and thus in particular to an increase in the size of the rear bearing, which has an effect on the mechanical and/or electronic environment of the rotary electrical machine, since the size of the rear bearing 8 should not be increased in order to avoid any mechanical interference, in particular with the rear fan 12, or with the sensor-holders, or with the resolver.

Modification of the protective cover should also be avoided, and, when the rotary electrical machine is provided with integrated electronics, so should modification of the interface with the integrated electronics of the machine.

SUMMARY OF THE INVENTION

The objective of the present invention is to reconcile these contradictory requirements.

The objective of the present invention is thus to create a specific front bearing which makes it possible not to change the dimensions of the rear bearing of the machine, and thus to create a specific front bearing which permit circulation of the air inside the rotary electrical machine, whilst permitting securing of the belt tension regulation device on the housing.

According to the invention, a rotary electrical machine of the aforementioned type, comprising at the front a pulley which is provided with a groove, and is integral with a rotor shaft passing through the front bearing of a housing configured to be secured on a fixed part, the said bearing comprising a base provided with a nose for fitting of a ball bearing for rotation of the shaft, and air inlet openings delimited by arms which connect the nose to a peripheral strip of material of the base, is characterised in that the arms belong to an area which widens towards the exterior, connecting the strip of material to the nose for offsetting of the nose at the front, in that it comprises a device for regulation of the tension of a belt, the said belt being received in the groove in the pulley, and the said device being secured on the housing, in that the regulation device comprises at least one roller for tensioning of the belt, and a central opening which permits passage of the air through the air inlet openings, and in that the offsetting of the nose at the front relative to the strip of material depends on the central thickness of the regulation device.

Thanks to the invention, the distance between the front and rear bearings is increased, which makes it possible to arrange the rear bearing despite the axial and transverse vibrations transmitted by the belt.

It is thus possible to keep the rear bearing, as well as the rotor, the stator, the electronic components, the cover and the fan(s) of the machine.

The regulation device permits passage of the air.

In addition, the roller(s) extend(s) at the front face of the thermal engine.

The offsetting at the front of the nose depends on the widened area.

According to other characteristics taken in isolation or in combination:

the brace which is interposed between the rotor and the inner ring of the front bearing has a length which is greater than that of the inner ring of the front bearing;

the front bearing is longer axially than the rear bearing with a smaller diameter;

the arms are inclined towards the exterior;

the widened area comprises thicker arms, which alternate circumferentially with thinner arms in order to delimit the air inlets circumferentially;

the thicker arms are ribbed;

the thicker arms have a specific radius of connection to the strip of material;

the arms of the widened area have the same thickness, and delimit the air inlets circumferentially;

the front bearing has a hollow form and comprises a peripheral rim provided with an air outlet;

the peripheral strip of material delimits the upper edge of the air inlet openings and the lower edge of the air outlets;

the regulation device comprises two parts which are coaxial to the axis of the rotor shaft, and fitted such as to be mobile in rotation relative to one another against resilient means with circumferential action, such as a spiral spring, a torsion spring, or a spring in the form of an arc of a circle;

the two parts are fitted such as to be mobile in rotation relative to one another against friction means;

the two coaxial parts are perforated centrally in order to permit the passage of the air through the air inlet openings;

one of the parts is fixed and is configured to be secured on the housing;

the fixed part comprises radial projections, such as ears or lugs, for its securing on the housing;

the front bearing comprises at least one axial protuberance for securing of one of the radial projections of the fixed part;

the other part is mobile in rotation relative to the fixed part and has a projection for support of a roller for tensioning of the belt;

the fixed part has a projection for support of another roller for tensioning of the belt;

the pulley is made of metal;

the metal pulley is covered locally with plastic material;

the pulley is made of plastic material reinforced for example by fibres and/or fillers;

the pulley comprises a groove with parallel flanks for receipt of a flat flexible belt;

the pulley comprises a groove with a trapezoidal form for receipt of a trapezoidal flexible belt;

the pulley comprises a groove with a base provided with furrows for receipt of a flexible belt of the poly-V (registered trademark) type;

the pulley comprises a groove with a base which forms meshing for receipt of a notched flexible belt;

the pulley is integral with an end of a rotor shaft integral with a rotor which the rotary electrical machine comprises;

the pulley is screwed onto the end of the shaft;

anti-rotation means intervene between the pulley and the end of the shaft;

the pulley is screwed and welded on the end of the shaft;

the pulley is screwed and glued on the end of the shaft;

the rotor of the rotary electrical machine is a claw rotor;

the rotor of the rotary electrical machine is a rotor with projecting poles;

the rotor with claws or projecting poles is provided with permanent magnets;

the rotor of the rotary electrical machine is a rotor with permanent magnets;

the rotary electrical machine is an electric motor;

the rotary electrical machine is an electric motor without brushes and is controlled by an inverter;

the rotary electrical machine is an alternator;

the rotary electrical machine is an alternator-starter;

the rotary electrical machine is a starter with a belt.

Other advantages will become apparent from reading the following description which is provided in a non-limiting manner, and with reference to the appended drawings.

In the figures, elements which are identical or similar will be allocated the same reference signs.

DETAILED DESCRIPTION OF THE PREFERRED EMBODIMENT(S)

As far as the elements in FIGS. 4 to 8 are concerned, reference will be made to the description of FIGS. 2 and 3 for further details, with elements which are identical or similar being allocated the same reference signs. The terms front and rear correspond to an orientation from left to right in FIGS. 6 to 8.

Figure 1:
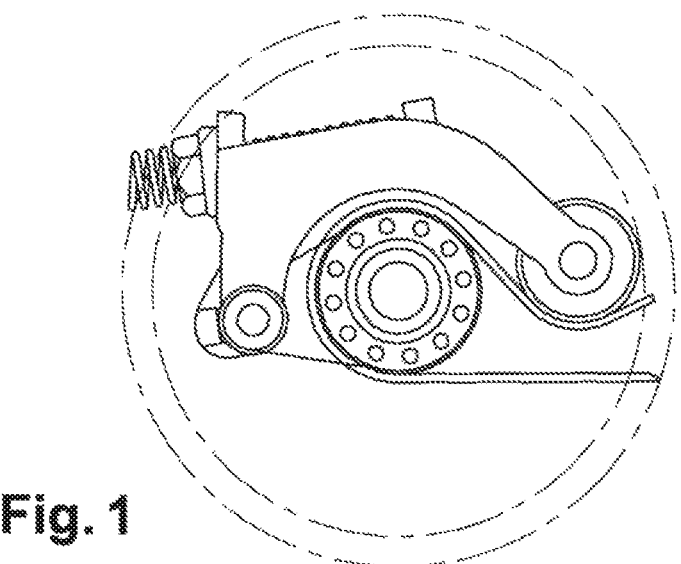
FIG. 1 is a front view of a front bearing of a rotary electrical machine according to the prior art provided with a pulley for receipt of a belt and a device for regulation of the tension of the belt.
Figure 2:
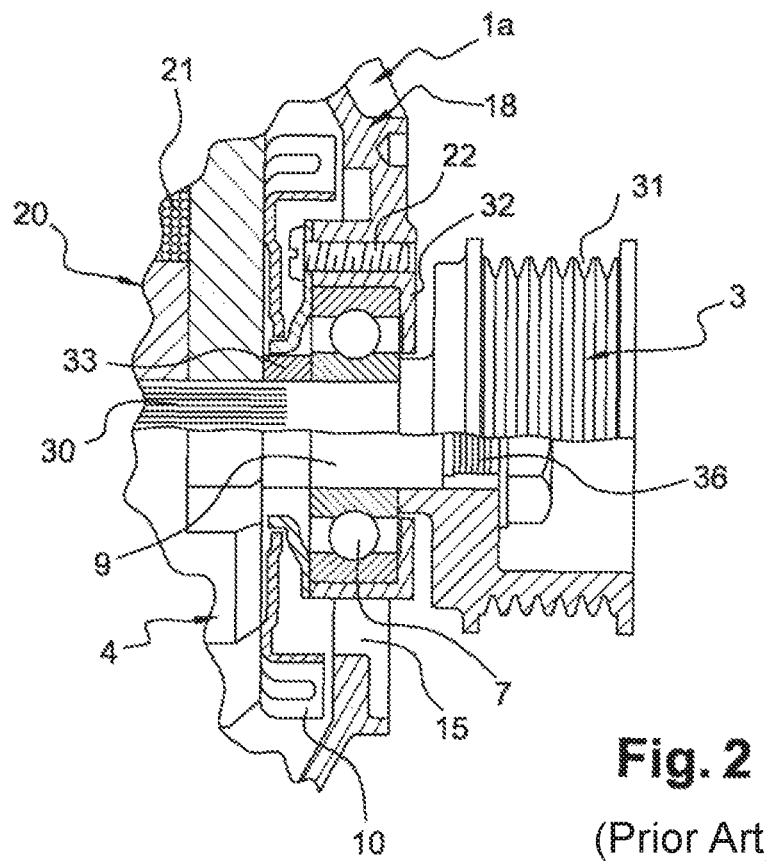
FIG. 2 is a view in cross-section of an alternator according to the prior art.
Figure 3:
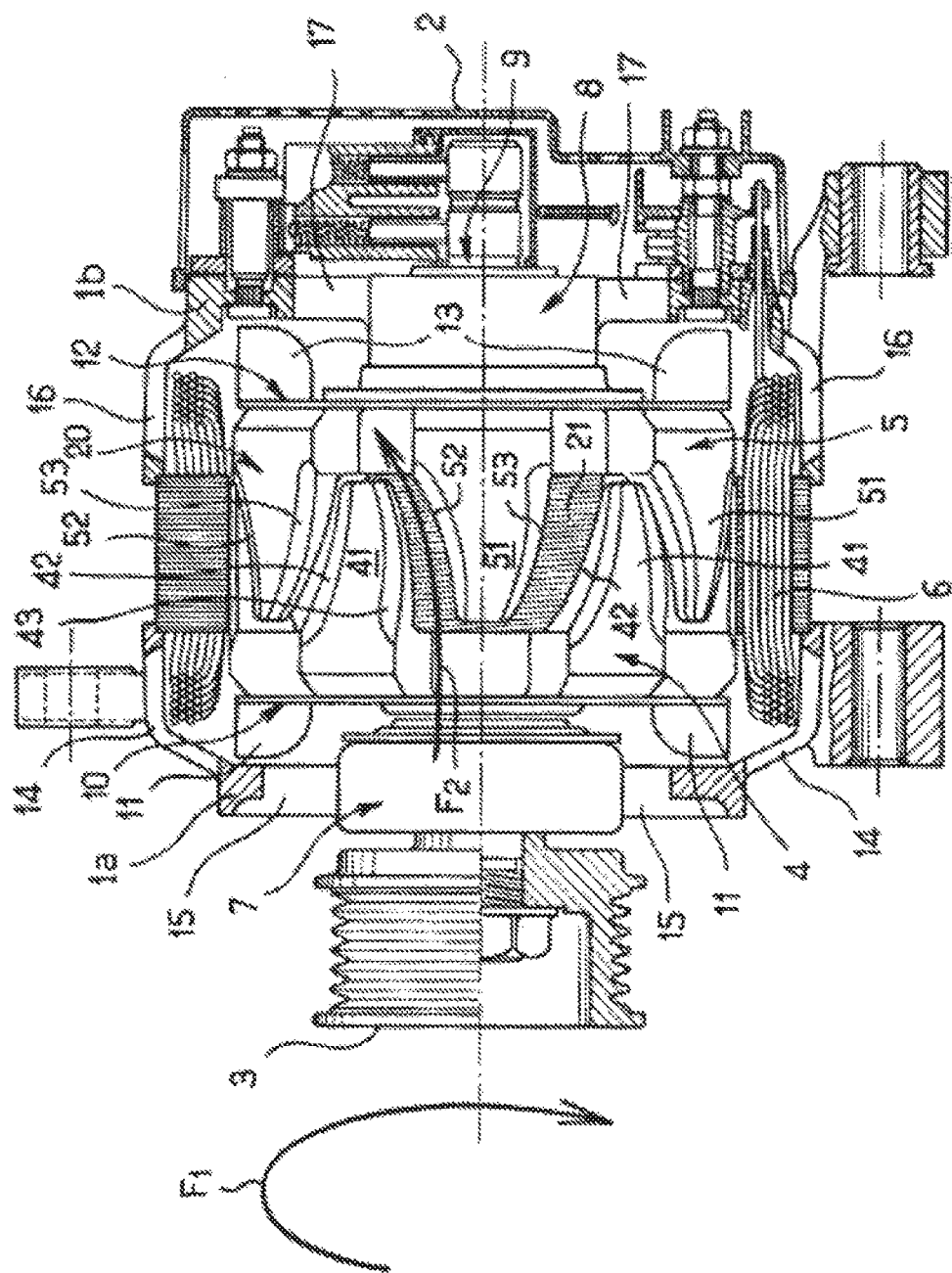
FIG. 3 is a partial view showing the front of the alternator in FIG. 2.

As in FIGS. 2 and 3, the rotary electrical machine in FIGS. 4 to 8 comprises at the front a pulley 3 for receipt of a flexible movement transmission belt which intervenes between the pulley 3 and a crankshaft pulley which is implanted on the front face of a thermal engine of a motor vehicle. The belt can also be used to drive the pulley of at least one other accessory of the motor vehicle, such as the pulley of the vehicle air conditioning compressor.

According to the invention, the rotary electrical machine in FIGS. 4 to 8 is provided with a device 100 for regulation of the tension of the belt, comprising at least one tensioning roller 200, 201. The roller (s) 200, 201 is/are aligned with the pulley 3. This device 100 intervenes at the front face of the thermal engine of the vehicle which is connected at the rear to a gearbox.

As previously stated, the rotary electrical machine comprises in FIGS. 4 to 8 a housing 1a, 1b, which is designed to be secured on a fixed (or stationary) part, such as the engine block of a motor vehicle, and on which there is fitted firstly a stator 6 and secondly, centrally, by means of bearings 7, 8, such as ball bearings with one or two rows of balls, a rotary rotor shaft 9, the axial axis of symmetry of which (shown in FIG. 7) defines the axis of rotation of the machine. The shaft 9 is integral with a rotor 20 which rotates inside the stator 6. A pulley 3 is fitted on the exterior of the housing and at one of the ends of the shaft 9, known as the front end, for example by screwing.

The housing comprises a front support flange (or front bearing) 1a adjacent to the pulley 3, and a rear support flange 1b (or rear bearing) which is furthest from the pulley. These support flanges 1a, 1b are known respectively as the front support flange (or front bearing) and the rear support flange (or front bearing), which in combination define the housing 1a, 1b. They are advantageously made of moldable material, and in this case of aluminum. In FIGS. 4 to 8, they have a hollow form, and comprise a peripheral rim (see FIG. 6, reference 338 for the rim of the front bearing 1a).

FIGS. 4 to 8 according to the invention represent only the elements which are necessary for understanding of the invention.

Thus, the flexible movement transmission belt described in the introduction is not represented, in the knowledge that the upper part of the belt is designed to cooperate with the roller(s) 200, 201, whereas the inner part of the belt is designed to cooperate with the groove 31 in the pulley 3.

Figure 6:
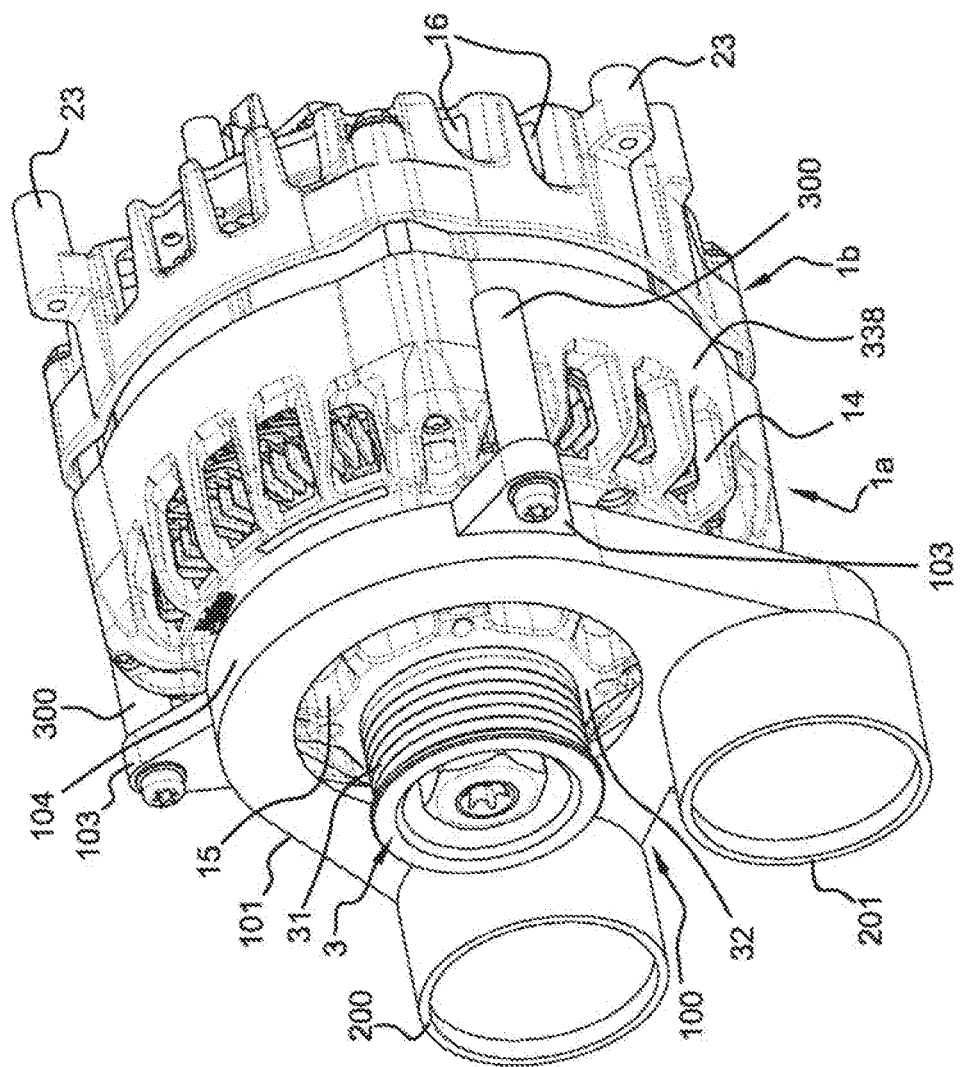
FIG. 6 is a view in perspective of an alternator according to the invention equipped with the front bearing in FIGS. 3 and 4.
Figure 7:
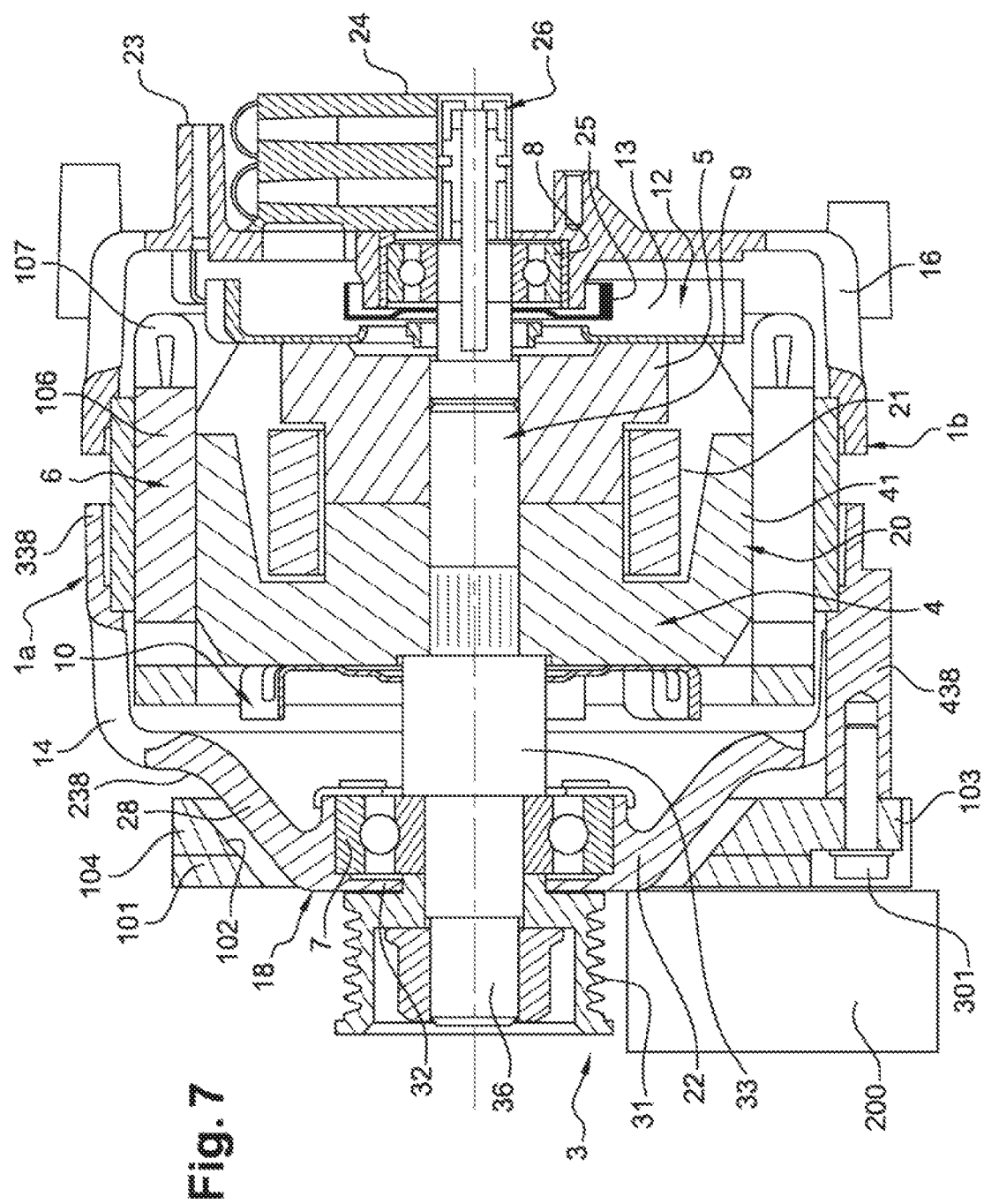
FIG. 7 is a view in axial cross-section of the alternator in FIG. 6.
Figure 8:
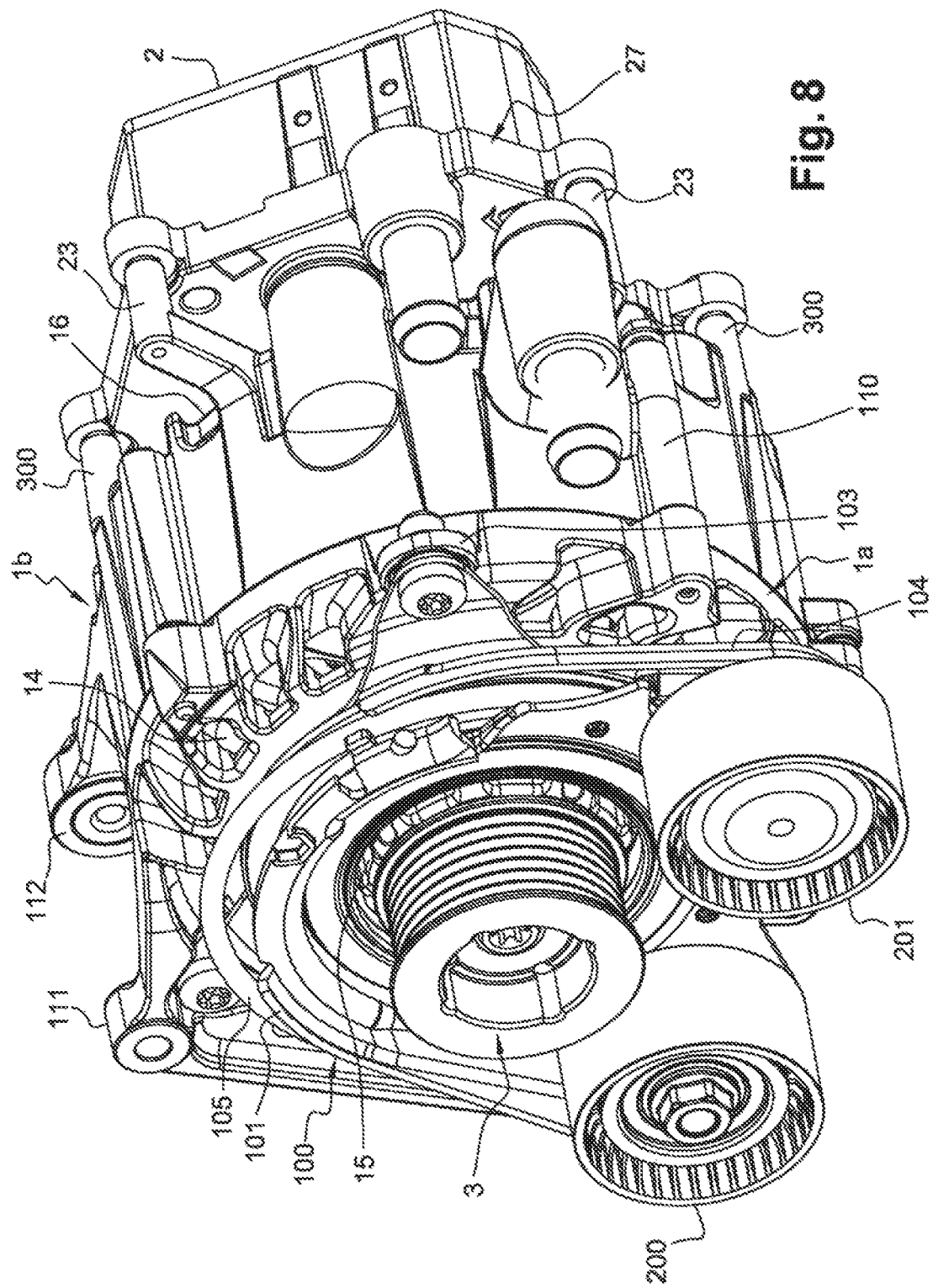
FIG. 8 is a complete view in perspective of another form of an alternator according to another embodiment of the invention.

Similarly, the configuration of the housing for its securing on a fixed part, such as projections for securing of the front 1a and rear 1b bearings on a fixed part, is not represented in FIGS. 4 to 7, since these parts are shown in FIG. 2, and also in FIG. 8 (see perforated ears 111 and 112 belonging respectively to the front bearing 1a and the rear bearing 1b).

The number of projections depends on the applications. In FIG. 8, the ears 111, 112, which are perforated for the passage of means for securing on the engine block of the vehicle, are aligned axially, and belong to a first area of securing on the engine block of the vehicle. In practice, at least one other securing lug is provided, belonging to the bearing 1a or the bearing 1b for formation of a second area of securing on the engine block.

As a variant, one of the bearings 1a, 1b comprises a securing plate with orientation which is tangential relative to its peripheral rim. The plate, implanted in the upper or lower part of the peripheral rim of the bearing 1a, 1b concerned, comprises for example two holes for the passage of means for securing on the engine block, such as screws or tie rods. The holes extend perpendicularly to the axis of the shaft 9. As a variant, one of the bearings 1a, 1b comprises at least one projecting shank for passage of means for securing on the engine block. The shank(s) extend(s) axially or perpendicularly relative to the axial axis of symmetry of the shaft 9. Thus, a single bearing 1a, 1b can comprise two shanks as a replacement for a tangential plate.

According to one embodiment, the front bearing 1a is provided with two diametrically opposite tangential plates for securing of the housing on the engine block, with one of the plates being replaced by two shanks as a variant. The housing is thus secured on the engine block only by the front bearing 1a. The converse is also possible, with the housing being secured on the engine block only by the rear bearing 1b.

In a manner described in the introduction, in the embodiment in FIGS. 4 to 8, the pulley 3 is advantageously a pulley for receipt of a belt of the poly-V type with six teeth which are designed to cooperate in a complementary manner with the six furrows of the groove 31 in the metal pulley 3, which is for example made of steel or aluminium, and is identical to that in FIG. 2. As a variant, the said pulley 3 is covered with plastic material, or as a variant it can be made of plastic material reinforced by fibres and/or fillers.

It will be appreciated that all the aforementioned variants for association of the pulley with the belt can be envisaged, i.e.:

pulley with a groove for receipt of a flat belt;
pulley with a groove for receipt of a trapezoidal belt;
pulley with a groove for receive of a notched flexible belt.

In all cases, the pulley is integral at one end with the shaft 9 which is integral with the rotor 20, and passes through the bearings 1a, 1b.

The pulley 3 is secured on the shaft 9 for example as in FIG. 2, by screwing.

Advantageously, means for blocking in rotation intervene between the pulley 3 and the shaft 9, in particular when the rotary electrical machine is an alternator-starter, in order to prevent the pulley 3 from working loose.

For example, the pulley 3 is welded on the end of the thread of the shaft 9 as described in document WO 2007/099260, to which reference will be made for further details. Thus, FIG. 8 shows the imprints which the pulley has for the receipt of the external tool.

As a variant, the welding is replaced by gluing. As a variant, the front end of the shaft comprises a frusto-conical portion which is designed to cooperate with the edge of the central hole with a complementary form in the pulley. A key can intervene between the shaft and the pulley. It will be appreciated that the rear sleeve of the pulley can be replaced in the aforementioned manner by a ring. Thus, the pulley 3 is always clamped, in particular when it is driving and driven.

In FIGS. 4 to 8, the rotor 20 is a claw rotor provided with teeth with a trapezoidal form and axial orientation, and as a variant is curved as in FIG. 2.

As a variant, in the aforementioned manner:

the rotor of the rotary electrical machine is a rotor with projecting poles;

the claw rotor is provided with permanent magnets between its teeth, as described for example in document FR 2 784 248, with the number of pairs of magnets being equal to, or less than, the number of pairs of teeth;

the rotor with projecting poles is provided with permanent magnets, as described for example in document WO 2013/136021, to which reference will be made;

the rotor of the rotary electrical machine is a rotor with permanent magnets, as described for example in document EP 0831 580 to which reference will be made.

In these FIGS. 4 to 8, the rotary electrical machine is a reversible alternator known as an alternator-starter. In addition to its function as a starter, and its function of starting/stopping the thermal engine of the vehicle, in the aforementioned manner this alternator-starter can carry out other functions according to its power level.

As a variant:

the rotary electrical machine is an electric motor;

the rotary electrical machine is an electric motor which is without brushes, and is controlled by an inverter, as described for example in document EP 0831 580;

the electrical machine is a starter with a belt;

the rotary electrical machine is an alternator.

It will be noted that an electrical machine with a rotor with permanent magnets, such as that in document EP 0 831 580, is reversible when its shaft is integral with an aforementioned pulley for receipt of a movement transmission belt. This motor can thus constitute an alternator when it is driven via the belt by the pulley of the thermal engine of the crankshaft of the vehicle.

It is possible to interpose a free wheel between the shaft and the pulley in order to transform this electric motor into a starter. Thus, via the pulley of the crankshaft of the thermal engine of the vehicle, a single belt can drive the pulley of a starter with a belt and the pulley of a conventional alternator, and optionally the pulley of the compressor of the air conditioning installation.

In all cases the rotary electrical machine comprises at the front a pulley 3 for receipt of a belt integral with a shaft 9 of the rotor 20 which passes through the front bearing 1a of a housing configured to be secured on a fixed part, the said bearing 1a comprising a nose 18 for fitting of a ball bearing 7 for rotation of the shaft 9 and air inlet openings 15.

Figure 5:
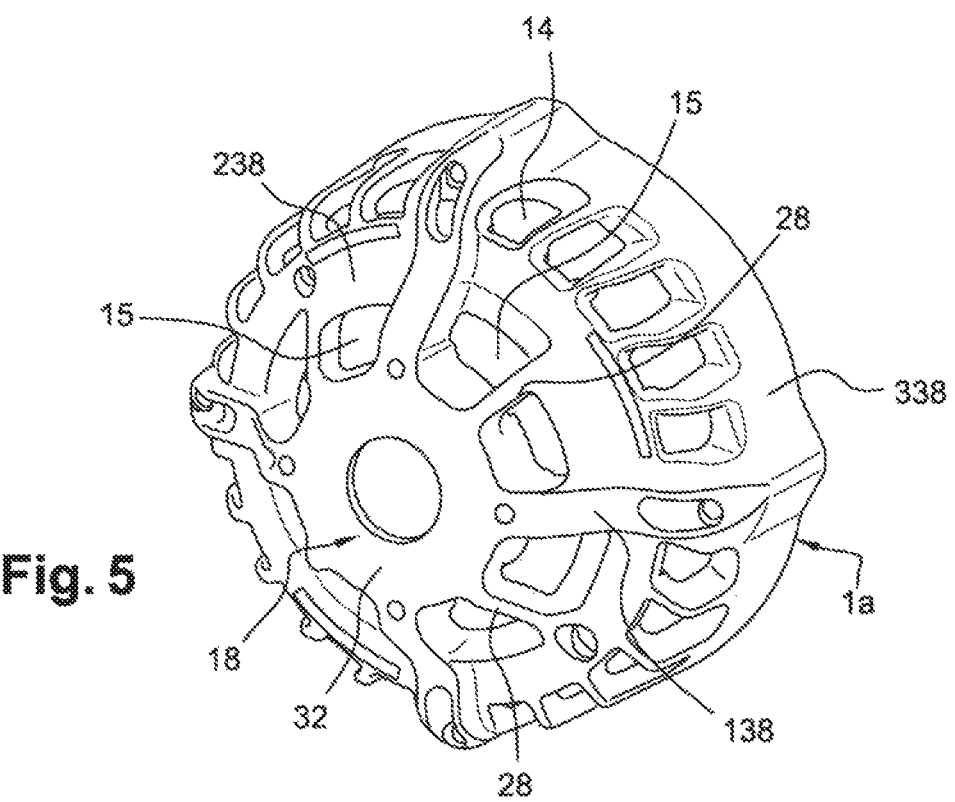
FIG. 5 is a view in perspective showing the front of the front bearing in FIG. 4.

The nose 18 has a globally annular form, and comprises a sleeve 22 and a ring 32, as in FIGS. 2 and 3. FIG. 5 shows holes which are used for securing of the retention ring (with no reference in FIGS. 6 to 8) of the outer ring of the bearing 7. The inner ring of the bearing 7 is fitted onto the shaft 9.

In these figures, the rotary electrical machine is equipped with a device for regulation of the tension of the belt 100, and it can be seen that, according to a characteristic of the invention, (see FIGS. 4 and 5), the nose 18 for fitting of (or receiving) the ball bearing 7 has been displaced forwards in order to implant the device for regulation of the tension of the belt (FIGS. 6 to 8). In other words, as best shown in FIG. 7, the peripheral strip of material 238 of the base is axially offset from the nose 18 and the front ball bearing 7 so that the nose 18 is disposed axially between the pulley 3 and the peripheral strip of material 238. This offsetting depends on the thickness of the central part of the regulation device 100, which has a central opening 102 (FIGS. 6 to 8) permitting passage of the air through the air inlets (or inlet openings) 15. As best shown in FIG. 7, the central opening 102 of the regulation device 100 is disposed radially around the nose 18 and the arms 138, 28 of the base 238, 138, 28, 18 of the front support flange 1a. In other words, the nose 18 is offset at the front, such that the groove 31 in the pulley 3 is aligned radially with at least one roller 200, 201 of the regulation device 100.

In addition, the axial distance between the nose 18 and the strip of material 238 is at least equal to the axial thickness of the regulation device 100, and in particular greater then the said thickness.

Figure 4:
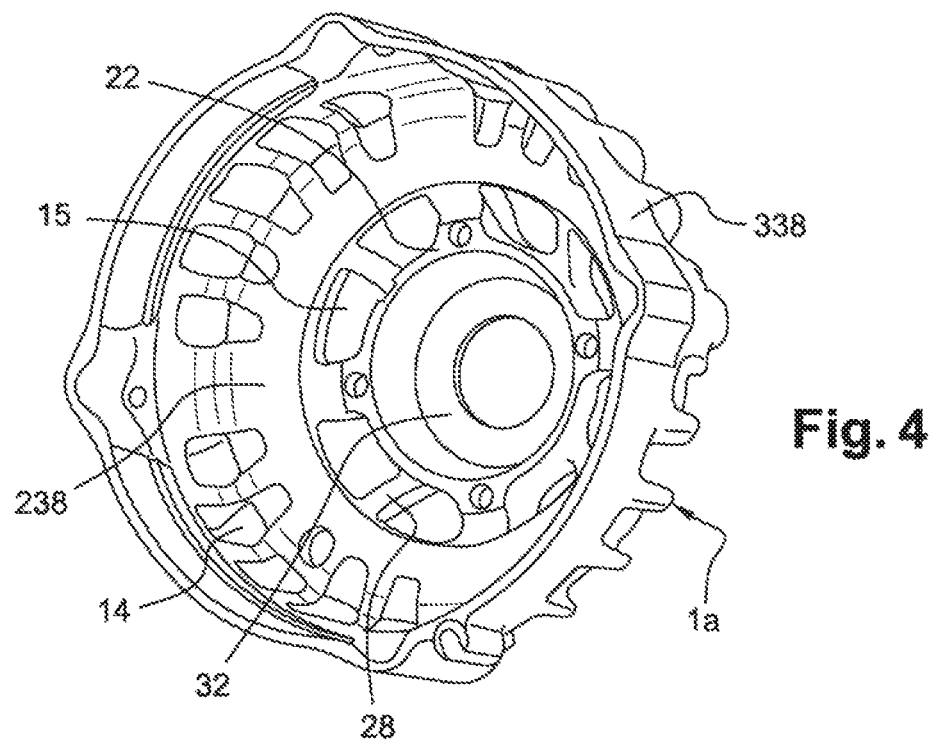
FIG. 4 is a view in perspective showing the rear of the front bearing according to an embodiment of the invention.

In these FIGS. 4 and 5, it can be seen that the air inlet openings 15 are delimited circumferentially by inclined arms 28, 138 which connect the nose 18 to a peripheral strip of material 238 with a globally annular form.

This strip of material 238 has globally transverse orientation relative to the axis of the shaft 9 and delimits partly the base of the front bearing 1a with a globally annular form. According to one characteristic, the front bearing 1a comprises a base 238, 138, 28, 18 comprising a peripheral strip of material 238 which is extended forwards by arms 138, 28, belonging firstly to an area which widens towards the exterior, connecting the protuberant nose 18 at the front to the strip of material 238, and secondly delimiting the air inlets 15.

In FIGS. 4 to 8, the front bearing 1a has a hollow form, and this peripheral strip of material 238 delimits the upper edge of the air inlets 15, and the lower edge of the air outlets 14 affecting the peripheral rim 338 of the front bearing 1a with a hollow form. Thus, the front bearing 1a with a hollow form comprises a peripheral rim with 338 with an annular form, which is connected at the front to a base 238, 138, 28, 18 comprising a strip of material 238 which is extended forwards by arms 138, 28 delimiting the air inlets 15, and connected at the front to the protuberant nose 18. Moreover, the air outlets (14) are axially and radially spaced from the base 238, 138, 28, 18 of the front bearing 1a and the air inlets 15. The arms 138, 28 belong to an area which widens towards the exterior, connecting the nose 18 to the strip of material 238 of the base of the front bearing 1a. In other words, the air inlets 15 are delimited radially by the peripheral strip of material 238 and the nose 18, and circumferentially by the inclined arms 28, 138, which connect the nose 18 to the peripheral strip of material 238.

In FIGS. 4 and 5, the widened area comprises two series of arms 138, 28, an arm 138 being interposed circumferentially between two arms 28. The arms 138 are thicker than the arms 28. These thick arms 138 are arms for rigidifying the base of the bearing 1a, and are advantageously ribbed as can be seen in FIG. 5, in order to increase their rigidity further. They affect the strip of material 238, and are extended towards the exterior in order to join a radial protuberance in the form of an ear (with no reference) which the rim 338 has. This protuberance is perforated for the passage of a tie rod for assembly of the front bearing 1a on the rear bearing 1b. One of the tie rods can be seen at 110 in FIG. 8.

The arms 138 have a specific radius of connection to the strip of material 238, in order to reduce the stresses.

The arms 138, 18 can be inclined circumferentially in the direction indicated by the arrow in FIG. 5, corresponding to the direction of rotation of the pulley 3 when the latter is driven (see also arrow F1 in FIG. 2).

As a variant, the base of the bearing 1a has only thinner arms 28, which are or are not inclined circumferentially.

According to one embodiment (not shown) the front bearing 1a comprises a base which is secured directly on the rear bearing 1b provided with the air outlets 16. The securing can be carried out by means of screws.

According to one characteristic (FIG. 7), the brace 33 through which the shaft 9 passes, and which is interposed between the inner ring of the bearing 7 and the front face of the magnet wheel 4 of the claw rotor, has an axial length which is longer than the axial length of the inner ring of the bearing 7. This characteristic makes it possible to offset the nose 18 at the front.

According to another characteristic (see FIG. 7) the axial length of the brace 33 is longer than the axial length of the inner ring of the rear bearing 8 with a smaller diameter than the front bearing 7.

Advantageously, the axial length of the rear bearing 8 is shorter than the axial length of the bearing 7.

In all cases, there is advantageously conservation of the structure of the rotor and of the stator of the machine, as well as of the size of the rear bearing 8 and that of the rear fan 12.

The electronics of the machine can be conserved, in particular the rectifier bridge and/or the means for monitoring the rotation of the rotor. The openings 14, 16, 17 can be conserved, as well as the cover 2 and the fans 10, 12, in the knowledge that, as a variant, the front fan 10 can be a fan flange, as described in the aforementioned document WO 2013/136021.

It will be appreciated that the rear bearing 8, with a smaller diameter than the bearing 7, is subjected to less stress than in a solution in which the nose 18 is not offset at the front, in the knowledge that the belt received in the pulley generates axial and transverse vibrations.

All the forms of the bearing 1a are obtained easily by moulding, as are the securing means, described hereinafter, which the housing has for securing of the device 100.

First Embodiment

In FIGS. 4 to 7, the alternator-starter differs from that in FIGS. 2 and 3 by its nose 18 which is extended forwards in the aforementioned manner, and by its device for regulation of the tension of the belt.

It also differs in that its stator 6 has a stator body 106 in the form of a set of plates, the notches of which are configured for fitting of a winding 107 in the form of bars with two layers extending on both sides of the body 106 of the stator, as described for example in document EP 0 881 752, to which reference will be made for further details. As a variant, it comprises more than two pairs of layers of conductors.

The number of notches in the body 106 depends in the aforementioned manner on the number of phases and the number of teeth of its magnet wheels 4, 5, which can vary from 6 to 8 per magnet wheel 4, 5.

The connection of the rotor shaft 9 to the magnet wheels is also different, with the hub of the claw rotor being in two parts each belonging to one of the magnet wheels 4, 5, as shown in FIG. 7. This connection is carried out in this case by crimping, with the shaft 9 having a centring area and two crimping areas arranged on both sides of the centring area, for securing of the front and rear ends respectively of the wheels 4, 5 by crimping as described in patent EP 2 067 238, to which reference will be made. In the light of this document, it can be seen that permanent magnets can be interposed circumferentially between two consecutive teeth of a wheel 4 and a wheel 5, in order to increase the power of the machine.

It will be appreciated that, as a variant, the wheels 4, 5 are assembled in the aforementioned manner by means of knurled portions of the shaft 9.

Another difference concerns the fact that the electronics of the machine comprise an inverter, fitted on a mezzanine of the housing (with the reference 27 in FIG. 8), fitted above the base of the rear bearing 1b by means of small columns 23, as described for example in document WO 2006/129030 and in document WO 2004/040738, to which reference will be made.

In FIG. 7, the collector has the reference 26, and 24 is the brush-holder tension regulator assembly previously referred to in FIGS. 2 and 3. The reference 25 designates the magnetic target which the alternator-starter has in the aforementioned manner, for monitoring the rotation of the rotor. For further information, reference will be made for example to document WO 01/69762.

In this embodiment, the connector 26 and the brush-holder are interposed between the base of the rear bearing 1b and the mezzanine.

The embodiment in FIG. 8 shows piping (with no reference) for cooling of the mezzanine 27 by means of a cooling liquid.

In this embodiment, the regulation device 100 comprises two coaxial parts 101, 104 fitted such as to be mobile in rotation relative to one another against resilient means (not shown) with circumferential action, and advantageously friction means. These parts 101, 104 have an axis which is combined with that of the shaft 9, and therefore have the same axis as that of the shaft 9.

These parts 101, 104 are perforated centrally, and each support a roller 200, 201 for tensioning of the belt each by means of a projection (with no reference). The holes in the parts have a diameter which permits the passage of air the through the air inlets.

The parts 101, 104 are advantageously made of metal plate for reduction of the thickness of the device 100. The inner bore 102 in the parts 101, 104 has a frusto-conical form designed for the widened area of the arms 138, 28, with a gap existing between the arms 138, 28 and the outer edge of the bore 102, for introduction of air into the housing 1a, 1b of the alternator-starter, which has internal ventilation as in FIGS. 2 and 3.

The axial offsetting of the nose 18 thus depends on the thickness of the central part of the parts 101, 104, and thus on the central part of the device 100 which is perforated centrally. It is the widened area which permits this offsetting of the nose 18 at the front.

Thus, according to the invention, a rotary electrical machine of the aforementioned type, comprising at the front a pulley 3 which is provided with a groove 31 and is integral with a rotor 20 shaft 9 passing through the front bearing 1a of a housing configured to be secured on a fixed part, the front bearing 1a comprising a base 238, 138, 28, 18 provided with a nose 18 for fitting of (i.e. receiving) a ball bearing 7 for rotation of the shaft 9, and air inlet openings 15 delimited by arms 138, 28 which connect the nose 18 to a peripheral strip of material 238 of the base, is characterized in that the arms 138, 28 belong to an area which widens towards the exterior, connecting the strip of material 238 to the nose 18 for offsetting of the nose 18 at the front, in that it comprises a device for regulation of the tension 100 of a belt received in the groove 31 in the pulley 3, and secured on the housing 1a, 1b, in that the regulation device 100 comprises at least one roller 200, 201 for the belt, and a central opening which permits passage of air the through the air inlet openings 15, and in that the offsetting of the nose 18 at the front depends on the central thickness of the regulation device 100.

On its outer periphery, the part 104 has radial projections 103, in this case perforated radial ears 103, for its securing on the housing 1a, 1b, which, in another embodiment, can be in three assembled parts, i.e. a front bearing 1a, a rear bearing 1b and an intermediate part interposed axially between the bearings 1a and 1b, and supporting the stator. As a variant, this intermediate part can support the electronics of the machine by means of the plate. As a variant, the electronics of the machine can be supported by a plate of the rear bearing 1b. As a variant, the projections 103 consist of radial lugs.

In FIGS. 4 to 8, three radial ears 103 are provided, secured on protuberances of the housing of the machine.

In the embodiment in FIGS. 4 to 7, the bearing 1a comprises an axial protuberance 438 for securing a radial ear 103 by means of a screw 301 on an axial protuberance 438 which the peripheral rim 338 has on its outer periphery.

The two other ears 103 are connected by tie rods to projecting ears which the mezzanine has. For this purpose, reference will be made to FIG. 8, which at 300 shows one of the tie rods and one of the ears of the mezzanine. As a variant, as can be seen in FIG. 8, one of the ears can be secured by means of a screw on a radial ear of the front bearing 1a of the mezzanine.

As a variant, the part 104 is secured via its three ears 103 on axial protuberances of the type such as the protuberance 438 which the bearing 1a has. In this case, the bearing 1a is advantageously provided in the aforementioned manner with two plates, one of which can be replaced by two shanks.

The number of ears 103 depends on the applications, and can be more than three.

In all cases, the part 104 is a fixed part, whereas the part 101 is mobile in rotation relative to the fixed part 104, and constitutes the regulation arm of the device 100.

The part 104 supports a roller 201 for tensioning of the belt by means of a projection (with no reference), which in this embodiment is globally in the form of an ear.

Similarly, the part 101 supports a roller 200 for tensioning of the belt by means of a projection (with no reference), which in this embodiment is globally in the form of an ear. The parts 101, 104 have a globally annular form, and each have a projection for support of a roller, respectively 200, 201.

The rollers 200, 201 are implanted on both sides of the pulley 3, below the latter, as can be seen in FIGS. 6 and 8. It will be appreciated that the rollers 200, 201 are aligned axially with the pulley 3. The roller 200 is subjected to stress when the alternator-starter is in alternator mode, whereas the roller 201 is subjected to stress in alternator mode. The belt forms a loop at the rollers 200, 201 and the pulley 3. More specifically, the upper part of the belt, engaged with the pulley of the crankshaft, comes into contact with the roller 200, then, by means of its lower part, it comes into contact with the base of the groove 31, and finally comes into contact with the roller 201, before being wound on the pulley of the crankshaft, whilst optionally passing via the pulley of the air-conditioning compressor at the outlet of the roller 201.

The roller 200 can be displaced under the action of resilient means with circumferential action which act between the parts 101, 104 in order to tension the belt, and regulate its tension in an optimum manner, in particular in order to prevent sliding of the belt, and to filter the vibrations in the above-described manner. The part 101 is thus a mobile regulation part.

The rollers 200, 201 are fitted such as to rotate respectively on the part 101 and on the part 104 by means of a pivot, such as a bolt, as in the aforementioned document EP 0 459 894. A bolt of this type can be seen in FIG. 8. A bearing can be interposed between the pivot and the inner edge of the roller 200, 201, as described in document EP 0 459 894.

The resilient means with circumferential action can be a spiral spring, as in document EP 0 459 894, to which reference will be made, one of the ends of the spiral spring being integral in rotation with the fixed part 104, and the other end of the spiral spring being integral in rotation with the mobile part 101. The rotary fitting of the mobile part 101 can be carried out as in document EP 0 459 894, to which reference will be made. The friction means, such as a friction washer, can be interposed between the outer face of the part 101 and the inner face of the folded-back end of the fixed part 104, whilst being glued on the part 101, or on the folded-back end of the part 104.

As a variant, the resilient means with circumferential action consist of a torsion spring, as described for example in utility model CN 203431112U to which reference will be made. In this case, the part 104 can have an inner centring sleeve for the part 101, with intervention of friction means. The inner diameter of the sleeve is sized for passage of the air through the openings 15.

Second Embodiment

In document EP 0 459 894, a version is provided with a curved spring which intervenes between the two parts of the regulation device. A spring of this type can be fitted between the two parts 101, 104. In this embodiment in FIG. 8, the curved spring is replaced by a blade 105 in the form of an arc of a circle which intervenes between the two parts 101, 102. The ends of this spring are secured on the parts 101 and 104 in the vicinity of the rollers 200, 201. Advantageously, the ends of the spring 105 are in the form of loops which are each wound around the pivot, such as a bolt concerned of the rollers 200, 201. The pivots are then extended, and each loop is interposed between the part and the roller concerned. This therefore forms a pendulum which intervenes between the two parts 101 and 102.

This pendulum makes it possible to absorb the tension peaks in the belt, and moderates the sliding of the belt. It makes it possible to increase the tension of the belt, and increases the service life of the front roller 7.

In this variant, the fixed part can have centrally a sleeve for centring of the mobile part 101, and a rear washer for fitting of a friction washer which intervenes between the fixed part 104 and an inner collar which the mobile part 101 has.

It will be noted that the rotor in this embodiment can be a rotor of the type described in the aforementioned document WO 2013/136021.

Third Embodiment

The invention applies to the alternator in FIGS. 2 and 3. In this case, the front bearing 1*a* is configured as in FIGS. 4 and 5 and their variant, and the roller 201 associated with the fixed part 104 is eliminated. It will be appreciated that all the structural variants in FIGS. 4 to 8 are applicable to the modified alternator in FIGS. 2 and 3

Other Embodiments

The structures can be inverted. Thus, the fixed part 104 can be secured on the axial protuberances which the strip of material 238 has, with the mobile part 101 being interposed axially between the front bearing 1*a* and the fixed part 104. In this case, the device 100 must be fitted after the belt.

In all cases, the device 100 comprises two coaxial parts 101, 104, which are fitted such as to be mobile in rotation relative to one another, against resilient means with circumferential action, and the offsetting of the nose 18 depends on the central thickness of the device 100 which is perforated centrally for passage of the air through the air inlet openings 15. The axis of the parts 101, 104 corresponds to the axis of the shaft 9. The solution clears space at the outer periphery of the bearing 1*a*.

The central opening 102 in the device can be circular, with the inner diameter of this opening permitting passage of the air through the air inlet openings 15.

The stator of the machine can comprise teeth on which coils are fitted, some of which are connected to one another in order to form one of the phases of the rotary electrical machine. For further details, reference will be made for example to document WO 2007/031679 which describes the number of teeth.

The teeth can be added onto a head.

The stator winding can comprise two or more continuous wire layers in stead of bars.

The rotary electrical machine can comprise a single front fan 10 and a front bearing provided with openings 14, 15, the other bearing being cooled by circulation of liquid, such as water for cooling of the thermal engine of the vehicle, by means of a channel which it has for this purpose. The front bearing 1*a* can thus be shallower, or comprise only a base, with the air outlet openings 14 being provided in the rear bearing 1*b*.

The fans 10 and 12 can have the forms described in particular in the introduction. A single fan can be provided, i.e. a rear fan 12 which aspirates air. In this case, the bearing 1*a* can comprise only air inlets 15.

Applications

In the aforementioned manner:
the rotary electrical machine is an electric motor;
the rotary electrical machine is an electric motor which is without brushes and is controlled by an inverter;
the rotary electrical machine is an alternator;
the rotary electrical machine is an alternator-starter;
the rotary electrical machine is a starter with a belt.

The invention claimed is:

1. A rotary electrical machine, comprising:
a housing (1*a*, 1*b*) including a front support flange (1*a*), the housing configured to be secured to a stationary part;
a rotor (20) and a rotor shaft (9) integral with the rotor (20);
a regulation device (100) configured to regulate the tension of a belt; and
a pulley (3) provided with a groove (31), the pulley (3) non-moveably secured relative to the rotor shaft (9) at a front of the housing adjacent to the front support flange (1*a*), the rotor shaft (9) passing through the front support flange (1*a*) of the housing;
the front support flange (1*a*) comprising a base (238, 138, 28, 18) provided with a nose (18) receiving a front ball bearing (7) for rotation of the rotor shaft (9), a peripheral strip of material (238) and air inlet openings (15) delimited by arms (138, 28) which connect the nose (18) to the peripheral strip of material (238) of the base;
the arms (138, 28) belong to a widened area (138, 28) of the base which widens towards the exterior, connecting the peripheral strip of material (238) to the nose (18), the peripheral strip of material (238) of the base is axially offset from the nose (18) and the front ball bearing (7) so that the nose (18) is disposed axially between the pulley (3) and the peripheral strip of material (238);
the belt being received in the groove (31) in the pulley (3);
the regulation device being secured on the housing (1*a*, 1*b*), the regulation device (100) comprising at least one roller (200, 201) for tensioning the belt, and a central opening (102) permitting passage of air through the air inlet openings (15);
the central opening (102) of the regulation device (100) disposed radially around the nose (18) and the arms (138, 28) of the base (238, 138, 28, 18) of the front support flange (1*a*);
the offsetting of the nose (18) at the front relative to the peripheral strip of material (238) depends on a central thickness of the regulation device (100).

2. The rotary electrical machine according to claim 1, wherein a brace (33) is interposed between the rotor (20) and an inner ring of the front ball bearing (7), and wherein the brace (33) has a length which is greater than a length of the inner ring of the front ball bearing (7).

3. The rotary electrical machine according to claim 2, wherein the widened area (138, 28) comprises thicker arms (138), which alternate circumferentially with thinner arms (28) in order to delimit the air inlet openings (15) circumferentially.

4. The rotary electrical machine according to claim 2, wherein the arms of the widened area have equal thickness and delimit the air inlet openings (15) circumferentially.

5. The rotary electrical machine according to claim 1, wherein the widened area (138, 28) comprises thicker arms (138), which alternate circumferentially with thinner arms (28) in order to delimit the air inlet openings (15) circumferentially.

6. The rotary electrical machine according to claim 5, wherein the thicker arms (138) are ribbed.

7. The rotary electrical machine according to claim 6, wherein the thicker arms (138) have a specific radius of connection to the peripheral strip of material (238).

8. The rotary electrical machine according to claim 1, wherein the arms of the widened area have equal thickness and delimit the air inlet openings (15) circumferentially.

9. The rotary electrical machine according to claim 1, wherein the regulation device (100) comprises two coaxial parts (101, 104) which are coaxial to an axis of the rotor shaft (9), and wherein the two parts (101, 104) are rotatable relative to one another against a resilient device with circumferential action.

10. The rotary electrical machine according to claim 9, wherein the two coaxial parts (101, 104) are rotatable relative to one another against a friction device.

11. The rotary electrical machine according to claim 9, wherein the two coaxial parts (101, 104) are perforated centrally in order to permit the passage of the air through the air inlet openings (15), and wherein one of the two coaxial parts is a fixed part configured to be secured on the housing (1a, 1b).

12. The rotary electrical machine according to claim 11, wherein the fixed part (104) comprises radial projections (103) for securing on the housing, and wherein the front support flange (1a) comprises at least one axial protuberance (438) for securing of one of the radial projections (103) of the fixed part (104).

13. The rotary electrical machine according to claim 11, wherein the other part (101) of the two coaxial parts (101, 104) is rotatable relative to the fixed part (104) and has a projection for support of a roller (200) for tensioning of the belt.

14. The rotary electrical machine according to claim 13, wherein the fixed part (104) has a projection to support another belt tensioning roller (204).

15. The electrical machine according to claim 9, wherein the central opening (102) of the regulation device (100) is frusto-conical and is disposed radially around the widened area of the arms (138, 28) with a gap between the arms (138, 28) of the base and the two coaxial parts (101, 104) of the regulation device (100) for introduction of air into the housing (1a, 1b) through the air inlet openings (15).

16. The rotary electrical machine according to claim 1, consisting of an alternator-starter.

17. The rotary electrical machine according to claim 1, wherein the pulley (3) is non-rotatably secured relative to a front end of the rotor shaft, with intervention of a device for blocking rotation of the pulley (3) relative to the rotor shaft (9).

18. The electrical machine according to claim 1, wherein the central opening (102) of the regulation device (100) is frusto-conical and is disposed radially around the widened area of the arms (138, 28) with a gap between the arms (138, 28) of the base and the central opening (102) for introduction of air into the housing (1a, 1b) through the air inlet openings (15).

19. The electrical machine according to claim 1, wherein the front support flange (1a) is further provided with air outlets (14) spaced from the base (238, 138, 28, 18) of the front support flange (1a) and the air inlet openings (15).

* * * * *